US010021061B1

(12) United States Patent
Bastide et al.

(10) Patent No.: US 10,021,061 B1
(45) Date of Patent: Jul. 10, 2018

(54) MESSAGE PRESENTATION MANAGEMENT IN A SOCIAL NETWORKING ENVIRONMENT

(71) Applicant: International Business Machines Corporation, Armonk, NY (US)

(72) Inventors: Paul R. Bastide, Boxford, MA (US); Matthew E. Broomhall, Goffstown, NH (US); Thomas J. Evans, IV, Cary, NC (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/785,465

(22) Filed: Oct. 17, 2017

Related U.S. Application Data

(63) Continuation of application No. 15/401,018, filed on Jan. 7, 2017.

(51) Int. Cl.
*G06F 15/16* (2006.01)
*H04L 12/58* (2006.01)
*H04L 29/08* (2006.01)

(52) U.S. Cl.
CPC .......... *H04L 51/32* (2013.01); *H04L 67/2804* (2013.01); *H04L 67/306* (2013.01)

(58) Field of Classification Search
None
See application file for complete search history.

(56) References Cited

U.S. PATENT DOCUMENTS

| 8,666,836 | B2 | 3/2014 | Adams |
| 9,342,851 | B2 | 5/2016 | Musil |
| 9,785,316 | B1* | 10/2017 | Kosslyn ................ G06F 3/0484 |
| 2010/0223341 | A1* | 9/2010 | Manolescu ....... G06F 17/30867 |
| | | | 709/206 |
| 2011/0004831 | A1 | 1/2011 | Steinberg et al. |
| 2011/0047228 | A1* | 2/2011 | Balasaygun ............ G06F 9/543 |
| | | | 709/206 |
| 2013/0346063 | A1* | 12/2013 | Chen .................... G06F 17/289 |
| | | | 704/3 |

(Continued)

FOREIGN PATENT DOCUMENTS

EP 2747013 A1 6/2014

OTHER PUBLICATIONS

Pending U.S. Appl. No. 15/401,018, filed Jan. 7, 2017, entitled: "Message Presentation Management in a Social Networking Environment", 62 pages.

(Continued)

*Primary Examiner* — Joshua Joo
(74) *Attorney, Agent, or Firm* — L. Jeffrey Kelly

(57) ABSTRACT

Disclosed aspects relate to message presentation management in a social networking environment. A message from a source may be detected in the social networking environment. An identified category for the message from the source may be identified based on a set of candidate categories. A presentation format for the message from the source may be determined by comparing a set of user profile criteria with the identified category for the message from the source. The message from the source may be presented in the social networking environment using the presentation format.

1 Claim, 6 Drawing Sheets

(56) References Cited

U.S. PATENT DOCUMENTS

| | | | |
|---|---|---|---|
| 2015/0106192 A1* | 4/2015 | Guo | G06Q 50/01 705/14.45 |
| 2015/0186494 A1* | 7/2015 | Gilad | G06F 17/30598 707/740 |
| 2015/0262238 A1* | 9/2015 | Aitchison | G06Q 30/0263 705/14.6 |
| 2015/0286619 A1* | 10/2015 | Chakra | G06F 17/28 704/9 |
| 2015/0301703 A1 | 10/2015 | Steinberg et al. | |
| 2016/0034712 A1* | 2/2016 | Patton | G06F 21/6245 726/28 |
| 2016/0156583 A1* | 6/2016 | Bank | H04L 51/32 709/206 |
| 2016/0156586 A1* | 6/2016 | Ranganath | H04L 51/32 709/206 |
| 2016/0378760 A1* | 12/2016 | Braz | G06Q 10/107 707/728 |
| 2017/0012913 A1* | 1/2017 | Lohani | H04L 67/306 |
| 2017/0039204 A1* | 2/2017 | Blanchflower | G06Q 10/10 |
| 2017/0142051 A1* | 5/2017 | Spivack | H04L 51/12 |
| 2017/0185601 A1* | 6/2017 | Qin | G06F 17/3053 |
| 2017/0208027 A1* | 7/2017 | Goldstein | H04L 51/22 |
| 2017/0353414 A1* | 12/2017 | Ertmann | H04L 51/04 |

OTHER PUBLICATIONS

IBM: List of IBM Patents or Patent Applications Treated as Related (Appendix P), Jan. 5, 2018, 2 pages.

SaneBox; "SaneBox at Work"; <https://www.sanebox.com/business>, Aug. 2, 2016, 3 pages.

\* cited by examiner

US 10,021,061 B1

MESSAGE PRESENTATION MANAGEMENT IN A SOCIAL NETWORKING ENVIRONMENT

BACKGROUND

This disclosure relates generally to computer systems and, more particularly, relates to message presentation management in a social networking environment. Social networking environments may be used to facilitate message communication among users. The amount of information communicated using social networking environments is increasing. As the amount of information communicated using social networking environments increases, the need for message presentation management may also increase.

SUMMARY

Aspects of the disclosure relate to message presentation in a social networking environment. Features may work with a social networking environment to detect the receiving of a message. Disclosed aspects may extract the content of the message with respect to various categories. The content of the message may be analyzed with respect to various categories in order to establish a method of presentation for the message. The message may be presented to the user according to the determined presentation format in order to tailor the viewstream of a user of a social networking environment to the specific preferences or interests of the specific user. Disclosed aspects may establish different presentation formats for different types of messages with different types or kinds of content. Features may present the message to the user based on the established presentation format.

Disclosed aspects relate to message presentation management in a social networking environment. A message from a source may be detected in the social networking environment. An identified category for the message from the source may be identified based on a set of candidate categories. A presentation format for the message from the source may be determined by comparing a set of user profile criteria with the identified category for the message from the source. The message from the source may be presented in the social networking environment using the presentation format.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
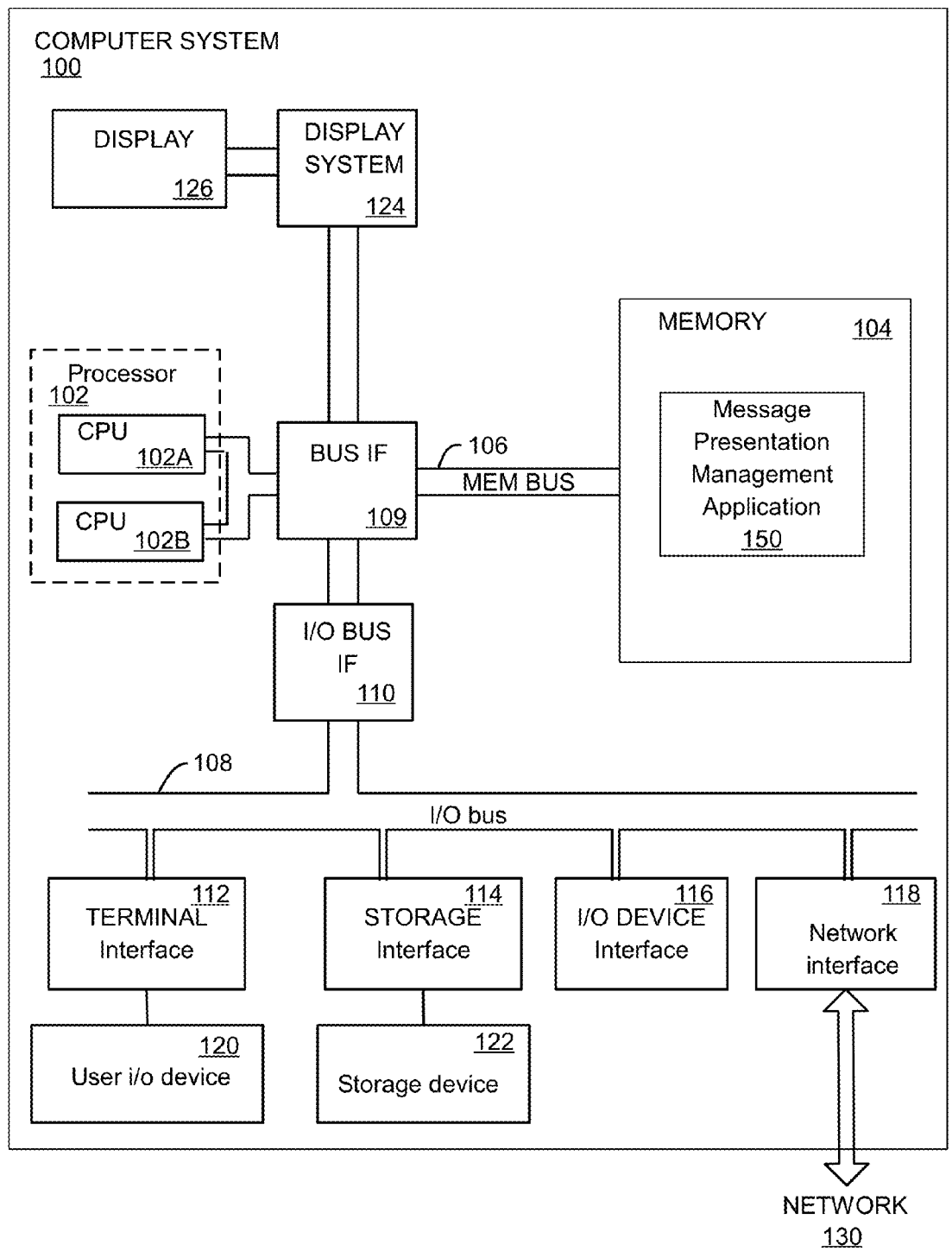
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to message presentation in a social networking environment. Features may work with a social networking environment to detect the receiving of a message. Disclosed aspects may extract the content of the message with respect to various categories. The content of the message may be analyzed with respect to various categories in order to establish a method of presentation for the message. The message may be presented to the user according to the determined presentation format in order to tailor the viewstream of a user of a social networking environment to the specific preferences or interests of the specific user.

Online social networks can connect people in different locations, with different interests, and of different ages. Users may be able to send messages to their connections about a wide range of topics with a wide range of views, including politics, science, finance, and sports. These messages may vary in intensity and result different reactions from the recipient. Negative interactions may result in recipients ignoring, filtering-out, or unsubscribing connections from their social networking environment. A user may desire to receive selective and controlled views of messages. Message presentation management may control the messages received by users through categorizing people and connections, evaluating messages with regards to a recipient-defined criteria for the category, and managing the presentation of the message. Message presentation management may enable a user to change subscription models for messages.

Aspects of the disclosure include a system, method, and computer program product for message presentation management in a social networking environment. A message from a source may be detected in the social networking environment. An identified category for the message from the source may be identified based on a set of candidate categories. A presentation format for the message from the source may be determined by comparing a set of user profile criteria with the identified category for the message from the source. The message from the source may be presented in the social networking environment using the presentation format.

In embodiments, the categories used to characterize messages may be predefined, machine-learned clustered, or crowd-sourced from the social networking environment. In embodiments, criteria for messages may include life events, action events, media events, natural language events, or temporal events. In various embodiments, a set of user profile criteria may be configured. In certain embodiments, the set of user profile criteria may be configured based on a set of similar users. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory. As an example, the use of message presentation management may save bandwidth. The presentation of relevant messages to a user instead of all messages may prevent a user from having to search for the messages they want to view. This may save both time and bandwidth for the user. Other methods of saving bandwidth using message presentation management may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a message presentation management application 150. In embodiments, the message presentation management application 150 may include instructions or statements that execute on the processor 102 or instructions or statements that are interpreted by instructions or statements that execute on the processor 102 to carry out the functions as further described below. In certain embodiments, the message presentation management application 150 is implemented in hardware via semiconductor devices, chips, logical gates, circuits, circuit cards, and/or other physical hardware devices in lieu of, or in addition to, a processor-based system. In embodiments, the message presentation management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
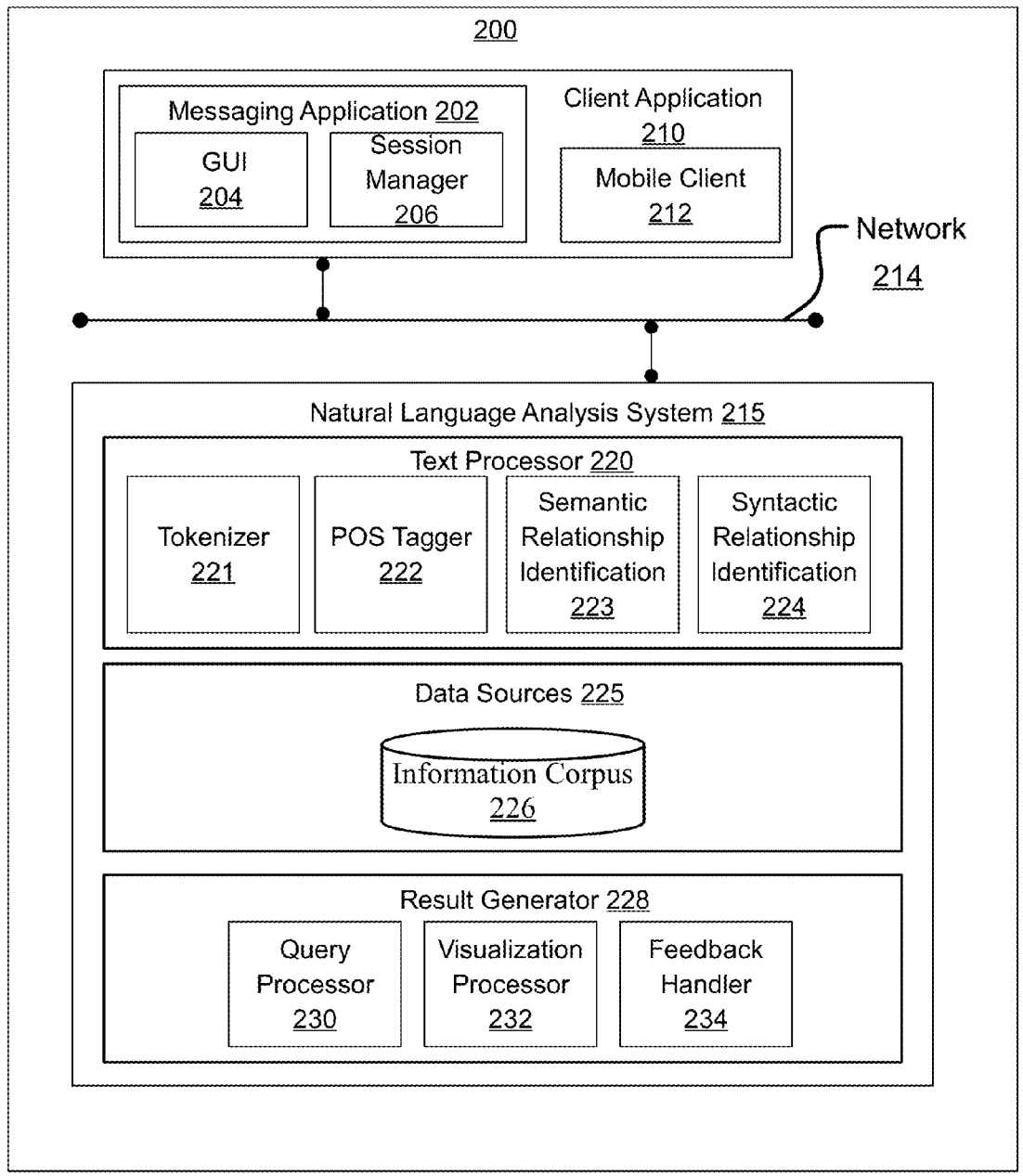
FIG. 2 is a block diagram illustrating an architecture for natural language analysis, according to embodiments.

FIG. 2 is a block diagram illustrating an architecture 200 for natural language analysis, according to embodiments. Aspects of FIG. 2 relate to performing one or more natural language processing and textual analytics operations to evaluate and interpret natural language elements (e.g., textual data, speech). In embodiments, natural language data may be collected from one or more remote devices (e.g., smartphones, tablets, laptop/desktop computers, other computing devices) by a natural language analysis system 215. The natural language analysis system 215 can perform methods and techniques for processing and interpreting the natural language data collected from the remote devices. Client applications 210 may involve one or more entities operable to generate events dispatched to natural language analysis system 215 via network 214. In certain embodiments, the events received at natural language analysis system 215 may correspond to electronic messages received from users, where the electronic messages may be expressed in a free form and in natural language.

An electronic message may be one or more words that form a phrase, sentence, paragraph, or other composition. The electronic message may include textual data, image data, video data, audio data, or other types of electronic media. Electronic messages may be composed of linguistic features including parts-of-speech, verb tenses, lexical categories, conjugations, punctuation, contractions, sentence types, and the like. In certain embodiments, the electronic message may include both restricted and unrestricted syntax for natural language expression.

In embodiments, client applications 210 can include one or more components such as a messaging application 202 and a mobile client 212. Client applications 210 can operate on a variety of devices. Such devices may include mobile and handheld devices, laptops, mobile phones, personal or enterprise digital assistants, personal computers, servers, or other computer systems configured to access the services and functionality provided by natural language analysis system 215. For example, mobile client 212 may be an application installed on a mobile or other handheld device. In embodiments, mobile client 212 may transmit electronic messages to natural language analysis system 215.

In embodiments, messaging application 202 can facilitate the composition and transmission of electronic messages to natural language analysis system 215. In certain embodiments, messaging application 202 can be a client application with respect to the natural language analysis system 215. In embodiments, messaging application 202 can transmit user-composed messages to natural language analysis system 215 for processing. Messaging application 202 may be installed on a personal computer, mobile device, server or other computer system. In certain embodiments, messaging application 202 can include a graphical user interface (GUI) 204 and session manager 206. Users may input electronic message text in GUI 204. In certain embodiments, GUI 204 may be a message composition window or other interface component to receive the input of natural language data. Users may authenticate to natural language analysis system 215 via session manager 206. In certain embodiments, session manager 206 may keep track of user activity across sessions of interaction with the natural language analysis system 215. Session manager 206 may keep track of the electronic messages that are submitted within the lifecycle of a session of a user. For example, session manager 206 may retain a succession of messages submitted by a user during a session. Information for sessions managed by session manager 206 may be shared between computer systems and devices.

In embodiments, client applications 210 and natural language analysis system 215 can be communicatively coupled through network 214 (e.g. the Internet, intranet, or other public or private computer network). In certain embodiments, natural language analysis system 215 and client applications 210 may communicate by using Hypertext Transfer Protocol (HTTP) or Representational State Transfer (REST) calls. In certain embodiments, natural language analysis system 215 may reside on a server node. Client applications 210 may establish server-client communication with natural language analysis system 215 or vice versa. In certain embodiments, the network 214 can be implemented within a cloud computing environment, or using one or more cloud computing services. Consistent with various embodiments, a cloud computing environment can include a network-based, distributed data processing system that provides one or more cloud computing services.

Consistent with various embodiments, natural language analysis system 215 may be configured to process and analyze the natural language included in electronic messages received from client applications 210. In certain embodiments, natural language analysis system 215 may include a text processor 220, data sources 225, and result generator 228. Text processor 220 can be a computer module that analyzes the received electronic messages. In certain embodiments, text processor 220 can perform various methods and techniques for analyzing the electronic messages syntactically and semantically. Text processor 220 may include various modules to perform analyses of received electronic messages. For example, text processor 220 may include a tokenizer 221, a part-of-speech (POS) tagger 222, semantic relationship identification 223, and syntactic relationship identification 224.

Consistent with various embodiments, tokenizer 221 may be a computer module that performs lexical analysis. Tokenizer 221 can convert a sequence of characters into a sequence of tokens. Tokens may be string of characters typed by a user and categorized as a meaningful symbol. Further, in certain embodiments, tokenizer 221 can identify word boundaries in an electronic message and break sentences into their component parts such as words, multiword tokens, numbers, and punctuation marks. In certain embodiments, tokenizer 221 can receive a string of characters, identify the lexemes in the string, and categorize them into tokens.

Consistent with various embodiments, POS tagger 222 can be a computer module that marks up a word in a text to correspond to a particular part of speech. POS tagger 222 can read a sentence or other text in natural language and assign a part of speech to each word or other token. POS tagger 222 can determine the part of speech to which a word corresponds based on the definition of the word and the context of the word. The context of a word may be based on its relationship with adjacent and related words in a phrase, sentence, question, or paragraph. In certain embodiments, the context of a word may be dependent on one or more previously received electronic messages. Examples of parts of speech that may be assigned to words include, but are not limited to, nouns, verbs, adjectives, adverbs, and the like. Examples of other part of speech categories that POS tagger 222 may assign include, but are not limited to, comparative or superlative adverbs, wh-adverbs, conjunctions, determiners, negative particles, possessive markers, prepositions, wh-pronouns, and the like. In certain embodiments, POS tagger 222 can tag or otherwise annotate tokens of a question with part of speech categories. In certain embodiments, POS tagger 222 can tag tokens or words of an electronic message to be parsed by other modules of natural language analysis system 215.

In embodiments, semantic relationship identification 223 may be a computer module that can identify semantic relationships of recognized entities in electronic messages composed by users. In certain embodiments, semantic relationship identification 223 may determine functional dependencies between entities, the dimension associated with a member, and other semantic relationships.

In embodiments, syntactic relationship identification 224 may be a computer module that can identify syntactic relationships in electronic messages composed of tokens posed by users to natural language analysis system 215. Syntactic relationship identification 224 can determine the grammatical structure of sentences, such as which groups of words are associated as "phrases" and which word is the subject or object of a verb. In certain embodiments, syntactic relationship identification 224 can conform to a formal grammar.

In embodiments, text processor 220 may be a computer module that can parse a received electronic message and generate a corresponding data structure for the message. For example, in response to receiving an electronic message at natural language analysis system 215, text processor 220 can output the parsed message as a data structure. In certain embodiments, the parsed question may be represented in the form of a parse tree or other graph structure. To generate the parsed message, text processor 220 may trigger computer modules 221-224. Text processor 220 can use functionality provided by computer modules 221-224 individually or in combination. Additionally, in certain embodiments, text processor 220 may use external computer systems for dedicated tasks that are part of the message parsing process.

In embodiments, the output of text processor 220 can be used by natural language analysis system 215 to associate content of the electronic message with data maintained in one or more data sources 225. In embodiments, data sources 225 may include data warehouses, information corpora, data models, and document repositories. In certain embodiments, the data sources 225 may include an information corpus 226. The information corpus 226 can enable data storage and retrieval. In certain embodiments, the information corpus 226 may be a storage mechanism that houses a standardized, consistent, clean and integrated form of data. The data may be sourced from various operational systems. Data stored in the information corpus 226 may be structured in a way to specifically address reporting and analytic requirements. In one embodiment, the information corpus 226 may be a relational database (e.g., conform to an ontology). In some example embodiments, data sources 225 may include one or more document repositories.

In certain embodiments, result generator 228 may be a computer module that generates output data structures for received electronic messages. For instance, the result generator 228 may be configured to generate associated sentiment analyses and confidence scores for one or more portions of the electronic message. Other types of results are also possible.

In embodiments, result generator 228 may include query processor 230, visualization processor 232 and feedback handler 234. When information in a data source 225 is coupled with an electronic message, a query associated with the requested data can be executed by query processor 230 to retrieve the data from the data source 225. Using the data retrieved by query processor 230, visualization processor 232 can render visualization of the retrieved data, where the visualization represents the retrieved data. In certain embodiments, visualization processor 232 may render various analytics to represent the data including, but not limited to, images, emoticons, animated gifs, charts, tables, dashboards, maps, and the like. In certain embodiments, visualization processor 332 can present the data to a user in understandable form.

In certain embodiments, feedback handler 234 can be a computer module that processes feedback from users on electronic messages processed by natural language analysis system 215. In certain embodiments, users may be engaged in dialog with the natural language analysis system 215 to evaluate the relevance, efficacy, or performance of processed messages. Result generator 228 may produce a list of candidate message results for a processed electronic message. The user may rank each answer according to its relevance, efficacy, performance, or quality. In certain embodiments, the feedback of users on processed messages may be used for future message processing sessions.

Figure 3:
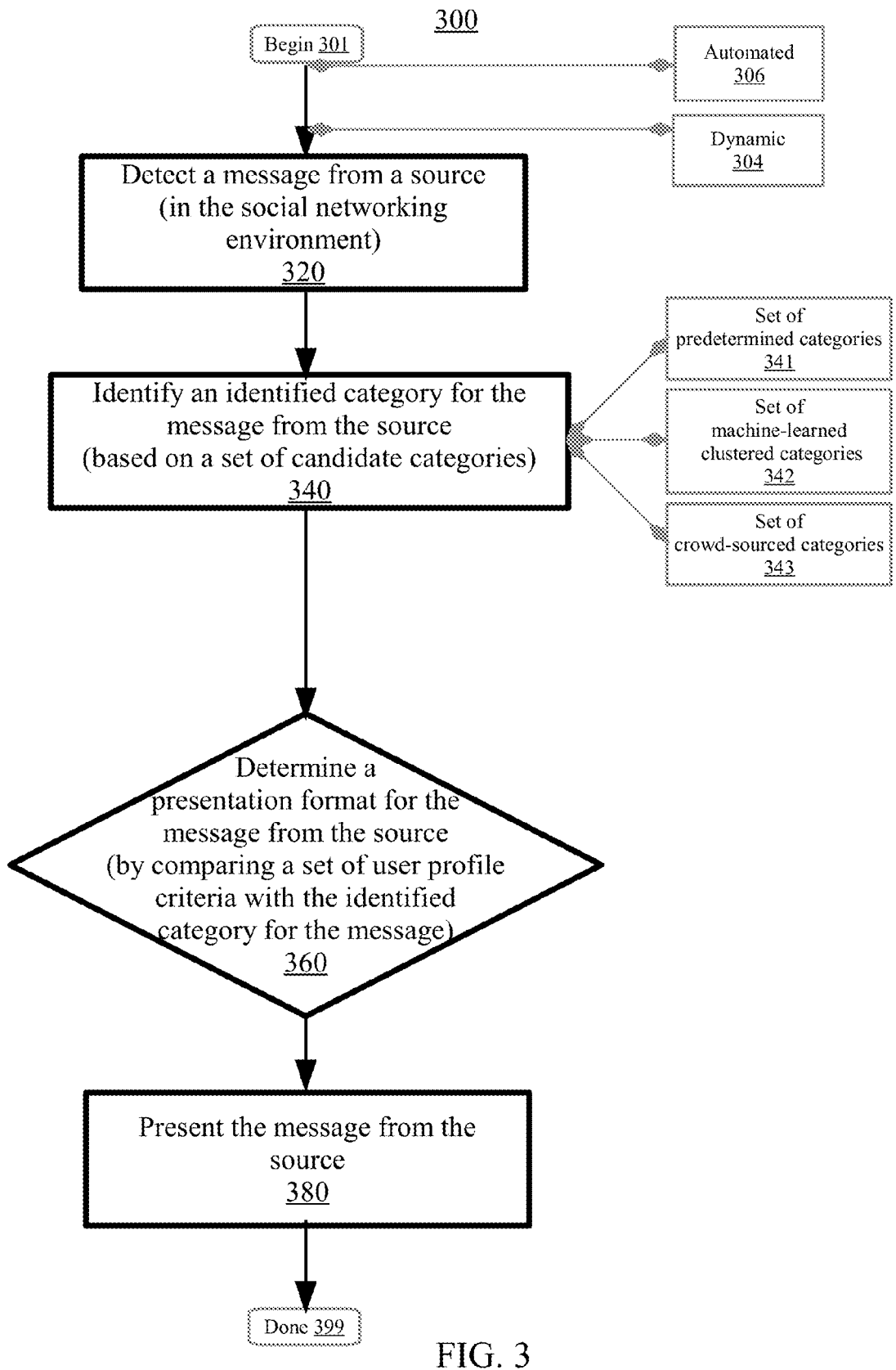
FIG. 3 is a flowchart illustrating a method for message presentation management in a social networking environment, according to embodiments.

FIG. 3 is a flowchart illustrating a method 300 for message presentation management in a social networking environment. The social networking environment can include a selection from a group consisting of at least one of: email, calendar, instant messaging (IM), short message services (SMS), wiki, community (e.g., micro-blog, professional connections, photo-sharing), newsfeed, project collaboration, product reviews, or the like. Aspects of FIG. 3 relate to using identified categories to dynamically manage the presentation of a message. The method 300 may begin at block 301.

In embodiments, the detecting, the identifying, the determining, the presenting, and the other steps described herein may each occur in a dynamic fashion to streamline message presentation management at block 304. The detecting, the identifying, the determining, the presenting, and the other steps described herein may be performed simultaneously (e.g., identifying an identified category for the message from the source while the user communicates with other users in the social networking environment) in order to streamline (e.g., facilitate, promote) message presentation management. Other methods of performing the steps described herein are also possible.

In embodiments, the detecting, the identifying, the determining, the presenting, and the other steps described herein may each occur in an automated fashion without user intervention at block 306. The detecting, the identifying, the determining, the presenting, and the other steps described herein may be carried out by an internal message presentation management module maintained in a persistent storage device of a local computing device. In certain embodiments, the detecting, the identifying, the determining, the presenting, and the other steps described herein may be carried out by an external message presentation management module hosted by a remote computing device or server. In this way, aspects of message presentation management may be performed using automated computing machinery without manual action. Other methods of performing the steps described herein are also possible.

At block 320, a message from a source may be detected in the social networking environment. Generally, detecting can include receiving, sensing, distinguishing, identifying, or otherwise differentiating a message from a source in the social networking environment. The message may include a post on a timeline, a photograph, a video, an audio message, an instant message, an electronic message, chat messages, social network comments/posts, a text message (e.g., SMS), an email, a message board, private exchanges between individuals, or other types of messages. The source may be an individual, a user, or a group of users of a social networking environment. The message from the source may be detected in the social networking environment. The social networking environment may include websites, applications, or other platforms through which a user may communicate with a source (e.g., text messaging application, email application, video chat application, social media website). When a source sends a message to a user via the social networking environment, the message presentation management engine may detect the message and begin to identify and determine the presentation format.

Consider the following example. A user may log on to a social networking environment. A friend of the user may log on to the same social networking environment and see that the original user is online. The friend may decide to send the user a message via a message on their timeline. The friend may write "Can't wait to watch the big game tonight!" on the timeline of the user. The user may receive the message from their friend on their timeline. The message presentation management engine of the social networking environment of the user may detect the message from the friend and begin to identify the content of the message in order to determine a presentation format. Other methods of detecting a message from a source may also be possible.

At block 340, an identified category for the message from the source may be identified based on a set of candidate categories. Generally, identifying may include ascertaining, determining, selecting, resolving, computing, or otherwise establishing an identified category for the message. The candidate categories may be general classifications or groupings with shared characteristics which may narrow down the type or kind of message viewed by the user in a social networking environment. The candidate categories may use information based on predetermined, machine-learned, or crowd-sourced classifications to assist in the determination of an identified category for the message. The set of candidate categories may tailor a viewstream of a social networking environment based on preset conditions or settings of the application, preferences of an individual user, or information from similar users. The viewstream can include a timeline, live activity feed, or other interface including a stream of social media content. In embodiments, in response to a candidate category being selected, the messages may be filtered through the identification of an identified category for the message. The identified categories may be (narrower) classifications or groupings with more specific shared characteristics which may describe (e.g., further narrow) the type or kind of message viewed by the user in the social networking environment. Through one or more levels of categorization (e.g., candidate categories, identified categories), the viewstream of a user may be tailored to the preferences or interests of the specific user of a social networking environment. The identified categories may allow the message presentation management engine to determine a presentation format for the message.

In embodiments, the set of candidate categories may be constructed to include various sets of categories. Generally, constructing can include creating, assembling, building, organizing, or otherwise generating the set of candidate categories to include various sets of categories. In embodiments, the set of candidate categories may be constructed to include a set of predetermined categories at block 341. The set of predetermined categories may be a group of classifications based on preset or programmed settings of a particular social networking application. The preset or programmed settings of the application may be separate from the preferences of the user. The predetermined categories may include a predetermined personal category, a predetermined confidential category, a predetermined opinion category, a predetermined life event category, a predetermined action factor category, a predetermined media characteristic category, a predetermined natural language category, or a predetermined temporal relevance category (as described herein). The settings of the application may predetermine certain presentation formats based on these categories. As an example, a particular social networking website may have a predetermined setting which automatically presents posts in the predetermined life event category at the top of the viewstream of a user.

In embodiments, the set of candidate categories may be constructed to include a set of machine-learned clustered categories at block 342. The set of machine-learned clustered categories may be a set of classifications which are learned automatically by the computer, application, or engine based on user actions with respect to groupings of similar types or kinds of messages. The set of machine-learned clustered categories may be determined based on learned preferences, algorithms, predictions, patterns, or interests of a particular user or a plurality of users. The machine-learned categories may be learned based on clustering of the natural language of a message and subsequently labeling the generated clusters. The machine-learned clustered categories may include a machine-learned life event category, a machine-learned action factor category, a machine-learned media characteristic category, a machine-learned natural language category, or a machine-learned temporal relevance category (as described herein). The machine-learned patterns may establish certain presentation formats based on these categories. As an example, a user may rarely respond to or click on messages with any type of media content. As a result, the message presentation management engine may filter-out or reduce the number of messages containing media content that are displayed to the user in the social networking environment.

In embodiments, the set of candidate categories may be constructed to include a set of crowd-sourced categories at block 343. The set of crowd-sourced categories may be a set of classifications which are based on the input or action of a group of users with respect to groupings of similar types or kinds of messages. The set of crowd-sourced categories may also account for the entire set of users of a social networking environment. The set of crowd-sourced categories may be determined based on preferences or interests of a group of users of a social networking environment. The crowd-sourced categories may include a crowd-sourced life event category, a crowd-sourced action factor category, a crowd-sourced media characteristic category, a crowd-sourced natural language category, or a crowd-sourced temporal relevance category (as described herein). The information collected from a group of users in a social networking environment may establish certain presentation formats based on these categories. As an example, messages with any type of media content may be popular in general with users of a particular social networking environment. As a result, messages containing media content may be more prominently displayed in the social networking environment of a particular user.

Consider the following example. A user of a social networking website may receive a message from a close friend about an engagement. The message from the friend may be detected by the message presentation management engine. The particular message from the friend may fall into the life event category based on the content (e.g., engagement) of the message. The message may also contain a photograph, so the message may also be sorted into the media characteristic category. The message may be from yesterday, so the recent content of the message may result in the message being sorted into the temporal relevance category. The social networking application may have predetermined settings for the life event category which automatically display messages containing life event content at the top of the viewstream of a user. The social networking application may have also detected a pattern regarding media content of messages. A user may frequently view or respond to messages with any type of media content, indicating a machine-learned preference for media content messages. Due to the photograph in this particular message, the particular message may be displayed at the top of the viewstream of the user. The social networking application may also have detected a pattern based on a group of users in the same social networking environment. Many users may interact with or respond to messages which are temporally relevant (e.g., from yesterday) as opposed to messages which are temporally irrelevant (e.g., from last month). Due to the general popularity of temporally relevant messages, the message from yesterday may be displayed at the top of the viewstream of the user. Due to the predetermined life event settings, the machine-learned media content settings, and the crowd-sourced temporal relevance settings, the message from the friend may be prominently displayed in the viewstream of this user. Other methods of identifying an identified category for the message based on a set of candidate categories may also be possible.

At block 360, a presentation format for the message from the source may be determined by comparing a set of user profile criteria with the identified category for the message from the source. Generally, determining may include identifying, computing, resolving, selecting, formulating, or otherwise ascertaining a presentation format for the message from the source. The presentation format may include a set of display attributes, qualities, characteristics, or features of a message in the social networking environment of the user. The presentation format may include presenting the user with the message, removing the message from the viewstream of the user, flashing the message in the viewstream of the user, enlarging the message, reducing the size of the message, changing the font of the message, or other methods of presentation (e.g., flashing a text message, placing an email at the top of the viewstream of the inbox of the user). The presentation format may be determined by comparing a set of user profile criteria with the identified category for the message from the source. Comparing may include relating, mapping, associating, evaluating, or matching/mismatching a set of user profile criteria with the identified category for the message from the source. The set of user profile criteria may be a user-specific table, database, set of rules, set of policies, or set of algorithms (of a user) which may be compared with the identified category for a message in order to determine a presentation format (e.g., comparing a user-specific preference for news articles with the content of the specific article in the viewstream). The comparison of a set of user profile criteria with the identified category for the message may allow the message presentation management engine to determine a presentation format for the message.

Consider the following example. A user may log on to a social media website, where there is a post by a retail store about a sale on shoes. The message presentation management engine may detect the existence of the post on the social media website. Identified categories for the post about the shoe sale may be identified by the message presentation management engine. As an example, the social networking application may have a predetermined setting with respect to temporal relevance. This particular post about the shoe sale may be from two weeks ago. Therefore, the post may not be temporally relevant to the user. Due to the temporal irrelevance of the post, the presentation format for the post may include filtering-out the post from the viewstream of the user. The social networking application may detect that this user has a particular interest in messages regarding important life events. The post about the shoe sale may not fall into the life event category. Due to the lack of life event content in the post, the presentation format for the post may include reducing the size of the post in the viewstream of the user. The social networking application may detect that users of this particular application have a preference for messages which have media content. The post about the shoe sale may contain photographs of the shoes, so the post may fall into the media content category. Due to the media content of the post, the presentation format for the post may include brightening the color of the photographs to catch the attention of the user. Other examples of determining a presentation format for a message may also be possible.

At block 380, the message from the source may be presented in the social networking environment using the presentation format. Generally, presenting may include providing, organizing, exhibiting, displaying, or otherwise arranging the message from the source in the social networking environment using the presentation format (e.g., enlarging, changing the color, hiding, using an accordion, brightening, changing the font, flashing the message, deleting the message). The message from the source may be presented in the social networking environment based on the comparison of user profile criteria (e.g., user settings, preferences) with the identified category for the message.

Consider the following example. A user may receive an email from a friend. The email may be detected in the inbox of the user by the message presentation management system. Identified categories for the email from the friend may be identified by the message presentation management engine. As an example, the email inbox may have a predetermined setting with respect to media content in a message. Messages with a media characteristic may automatically be displayed at the top of the inbox of a user. This particular email may not contain any media content. Due to the lack of media content in the email, the presentation format for the message may not include the placement of the email at the top of the inbox of the user. The social networking application may detect that this user quickly responds to any email containing life event information. The email may contain information about the death of a family member of this friend. Since messages with life event content may be important to the user, the presentation format for the message may include flashing this particular email in the inbox to catch the attention of the user. The social networking application may detect (e.g., in the user profile criteria) that users of this particular email application have a preference for messages which are temporally relevant. The email may have been sent two hours ago. Due to the temporal relevance of the email, the presentation format for the message may include changing the color of the preview of the email in the inbox. Other examples of presenting the message may also be possible.

Method 300 concludes at block 399. As described herein, aspects of method 300 relate to using identified categories to dynamically manage the presentation of a message. Aspects of method 300 may provide performance or efficiency benefits for the presentation of a message in a social networking environment. Aspects may save resources such as bandwidth, disk, processing, or memory. The use of candidate categories to determine a presentation format for a message may save bandwidth. As an example, a set of candidate categories which includes a set of crowd-sourced categories may allow the message presentation management engine to filter-out or reduce the number of messages which are unimportant or unpopular in general in the social networking environment. The viewing of unimportant, unpopular, or irrelevant messages in the social networking environment may waste bandwidth, so the introduction of a set of crowd-sourced categories to better tailor the messages in a viewstream of a user may save bandwidth. Other methods of saving bandwidth through the use of candidate categories may also be possible.

Figure 4:
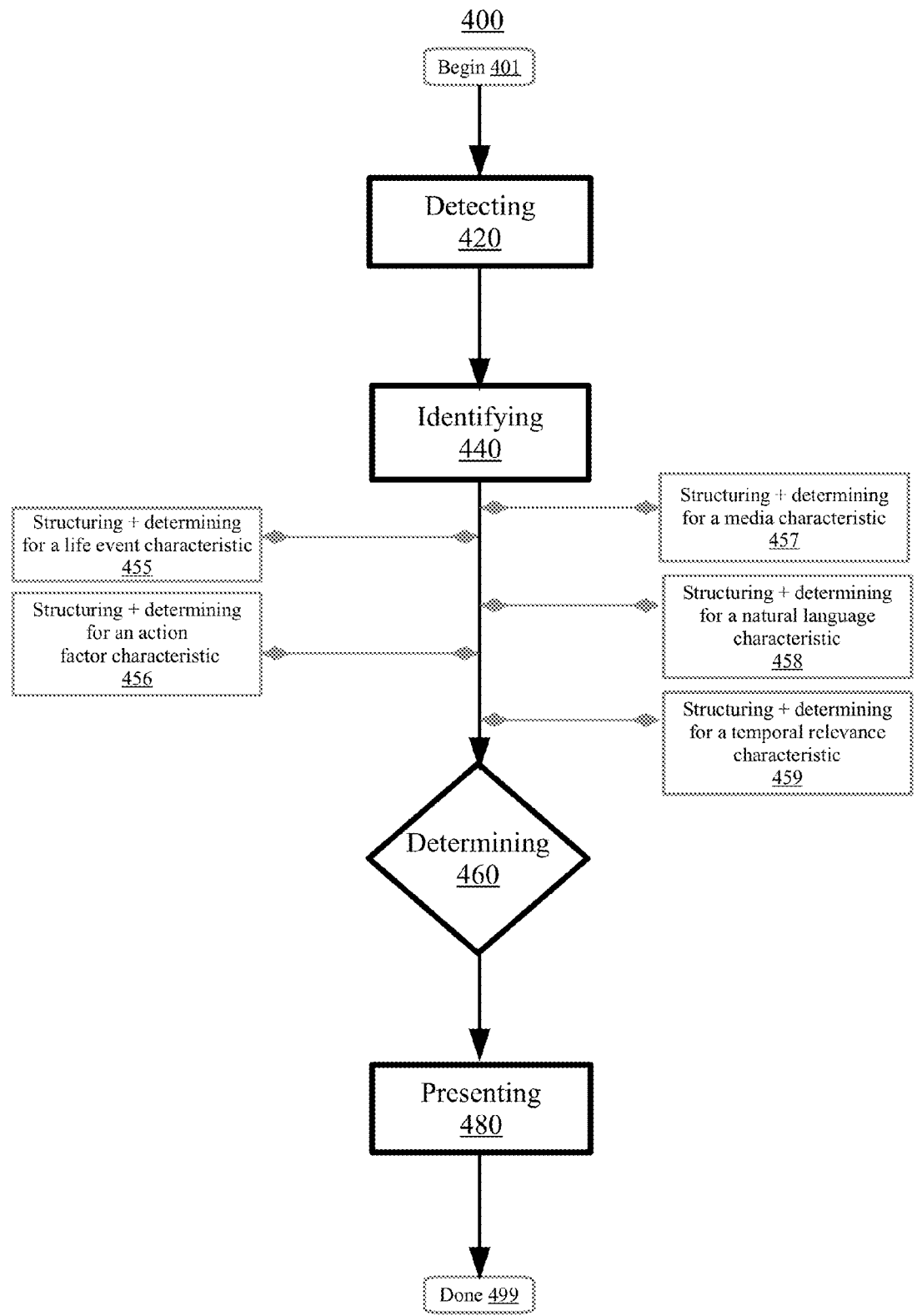
FIG. 4 is a flowchart illustrating a method for message presentation management in a social networking environment, according to embodiments.

FIG. 4 is a flowchart illustrating a method 400 for message presentation management in a social networking environment. Aspects method 400 may be similar or the same as aspects of method 300, and aspects may be utilized interchangeably with one or more methodologies described herein. The method 400 may begin at block 401. At block 420, a message from a source may be detected in the social networking environment. At block 440, an identified category for the message from the source may be identified based on a set of candidate categories.

In embodiments, structuring of the identified category and determining the presentation format for the message from the source may occur. Generally, structuring can include arranging, organizing, constructing, or otherwise configuring the identified category. As described herein, the identified category may include narrower classifications or groupings with more specific shared characteristics which may further narrow the type or kind of message viewed by the user in the social networking environment. The identified categories may be based on predetermined settings, machine-learned clustered settings, or crowd-sourced settings. By further narrowing the categories with respect to messages in a social networking environment, the message presentation management engine may tailor the presentation format to a particular user. The identified categories may include a life event characteristic, an action factor characteristic, a media characteristic, a natural language characteristic, or a temporal relevance characteristic. Different aspects or attributes in each characteristic may be configured in different ways. As an example, a social networking application may include a predetermined setting which filters-out any message with a specific natural language characteristic. Other natural language characteristics which are not the specifically indicated one may not be filtered-out from the social networking environment. Once the identified category is structured, a presentation format for the message from the source may occur using the established characteristic as described herein.

In embodiments, the identified category may be structured to have a life event characteristic at block 455. The established candidate categories may include predetermined, machine-learned, or crowd-sourced categories with respect to life events. The identified category may be a selected subset of the established candidate categories. The identified category may include or be based on more specific life events. The life event characteristics may include engagements (e.g., photographs of a ring, "she said yes" text), marriages (e.g., wedding photographs, wedding videos), deaths (e.g., sharing of an obituary), birthdays (e.g., calendar events, "happy birthday" text), anniversaries (e.g., photographs from an anniversary celebration, "happy anniversary" text), births (e.g., baby photographs, "it's a girl!" text), new jobs (e.g., "accepted a position" text, updated profile information including a new job), education milestones (e.g., photograph from high school graduation, photograph of college graduation, text paragraph about acceptance into college), or the like. The social networking application may include predetermined, machine-learned, or crowd-sourced categories with respect to each of the specific life events. The presentation format for the message from the source may be determined using the life event characteristic. Various presentation formats may occur for various aspects of the life event characteristic. As an example, a social networking application may have a predetermined setting to prominently display any message with content about a death. The candidate category may be the predetermined life event category, while the identified category may be the specific life event (e.g., death). The presentation format for posts pertaining to death may include displaying these messages at the top of the viewstream of the user.

In embodiments, the identified category may be structured to have an action factor characteristic at block 456. The established candidate categories may include predetermined, machine-learned, or crowd-sourced categories with respect to action factors. The identified category may be a selected subset of the established candidate categories. The identified category may include or be based on more specific action factors. The action factor characteristics may include comments (e.g., a comment on a photograph, emojis/emoticons in a comment on a video), replies (e.g., a reply to a question on a video), likes (e.g., likes on a text post), shares (e.g., shares of a hyperlink, shares of an article), removal of a comment or reply (e.g., the deletion of a comment on a video, the reporting and subsequent removal of a comment on a news article), viewing time (e.g., the amount of time a user spent look at a particular post), or the like. Messages may need to achieve a threshold number of these actions in order to be displayed to the user in the social networking environment. The social networking application may include predetermined, machine-learned, or crowd-sourced categories with respect to each of the specific action factors. The presentation format for the message from the source may be determined using the action factor characteristic. Various presentation formats may occur for various aspects of the action factor characteristic. As an example, a social networking application may detect that a specific user is uninterested in messages which have fewer than a threshold level (e.g., ten) of likes. The candidate category may be the machine-learned action factor category, while the identified category may be the specific action factor (e.g., likes). The presentation format for posts which do not achieve a threshold number (e.g., ten) of likes may include filtering-out these messages from the viewstream of the user.

In embodiments, the identified category may be structured to have a media characteristic at block 457. The established candidate categories may include predetermined, machine-learned, or crowd-sourced categories with respect to media characteristics. The identified category may be a selected subset of the established candidate categories. The identified category may include or be based on more specific media characteristics. The media characteristics may include video images (e.g., live videos, recorded videos, webcasts, video blogs, gifs), still images (e.g., photographs), audio messages (e.g., voice messages, electronic audio message), hyperlinks (e.g., links to other websites, links to other social networking applications, links to other types of media), or the like. The social networking application may include predetermined, machine-learned, or crowd-sourced categories with respect to each of the specific media characteristics. The presentation format for the message from the source may be determined using the media characteristic. Various presentation formats may occur for various aspects of the media characteristic. As an example, a social networking application may detect that users in general frequently interact with messages that contain video images. The candidate category may be the crowd-sourced media characteristic category, while the identified category may be the specific media characteristic (e.g., video image). The presentation format for posts containing video images may include enlarging these messages in the viewstream of the user.

In embodiments, the identified category may be structured to have a natural language characteristic at block 458. The established candidate categories may include predetermined, machine-learned, or crowd-sourced categories with respect to natural language characteristics. The identified category may further narrow down these categories. The identified category may be a selected subset of the established candidate categories. The natural language characteristics may include syntax (e.g. sentence structure, phrases, complete sentences), part of speech (e.g., nouns, verbs, adjectives, adverbs), complexity (e.g., computational complexity, linguistic complexity), character count (e.g., fifty characters, two hundred characters), grammar (e.g., grammatical errors, correct grammar, a threshold number of grammatical errors), spelling (e.g., spelling errors, no spelling errors, a threshold number of spelling errors), mentions (e.g., tagging a friend, tagging a webpage, tagging a location), quantitative values (e.g., 100, 50%, $30), hashtags (e.g., indicating a trending topic), language (e.g., English, Spanish, French), or the like. The social networking application may include predetermined, machine-learned, or crowd-sourced categories with respect to each of the specific natural language characteristics. The presentation format for the message from the source may be determined using the natural language characteristic. Various presentation formats may occur for various aspects of the natural language characteristic. As an example, a social networking application may have a predetermined setting to remove any post which exceeds a threshold number (e.g., three) of spelling errors. The candidate category may be the predetermined natural language characteristic category, while the identified category may be the specific natural language characteristic (e.g., spelling errors). The presentation format for posts exceeding a threshold level (e.g., three) of spelling errors may include deleting these messages from the viewstream of the user.

In embodiments, the identified category may be structured to have a temporal relevance characteristic at block 459. The established candidate categories may include predetermined, machine-learned, or crowd-sourced categories with respect to temporal relevance characteristics. The identified category may be a selected subset of the established candidate categories. The identified category may include or be based on more specific temporal relevance characteristics. The temporal relevance characteristics may include the longevity of the content (e.g., a video message which disappears after it is played, a message which is deleted after thirty days), streaming content (e.g., a real-time video, a live news story), age of the content (e.g., from two weeks ago, from last year), the date of the content (e.g., Jan. 2, Monday, 2016), or the like. The social networking application may include predetermined, machine-learned, or crowd-sourced categories with respect to each of the specific temporal relevance characteristics. The presentation format for the message from the source may be determined using the temporal relevance characteristic. Various presentation formats may occur for various aspects of the temporal relevance characteristic. As an example, news stories which exceed a threshold level of age may be filtered-out from the viewstream of the user to avoid confusion. A social networking application may detect that a user infrequently interacts with messages containing news stories exceeding a threshold temporal level (e.g., one month) of age. The candidate category may be the machine-learned temporal relevance characteristic category, while the identified category may be the specific temporal relevance characteristic (e.g., older than one month). The presentation format for posts exceeding a temporal level (e.g., one month) of age may include reducing the amount of these news stories in the viewstream of the user.

Consider the following example. A user may receive a message via a post on a social networking website. The message presentation management engine may identify identified categories for the post in order to determine a presentation format. The post may be from the wedding of a friend. The social networking website may have a predetermined setting with respect to posts containing content about weddings. The predetermined setting may be structured such that any post with content about weddings will be displayed at the top of the viewstream of the user. The determined presentation format for the post about the wedding may include displaying the post at the top of the viewstream on the social networking website when the user logs on. The post may include several photographs from the wedding. The social networking website may detect that this specific user frequently interacts with messages containing media content, especially those containing photographs. The machine-learned action may include increasing the size of the photograph in the viewstream of the user when the user logs on to the social networking website. The post about the wedding may only have two comments. The social networking website may detect a general popularity among users of posts which achieve a threshold number of five comments. Since the post about the wedding has a number of comments which does not exceed five, the presentation format for the post may include hiding the post from the viewstream of the user when they log on to the social networking website. Over time, the post may receive more comments. The post may eventually exceed the threshold number of five comments (e.g., seven comments). Once the post achieves five comments, the post about the wedding may no longer be hidden and may appear in the viewstream of the user. The post about the wedding may include a paragraph of text which contains sixty words. The social networking website may include a predetermined setting which hides any post exceeding a threshold number of fifty words. The presentation format for the post may include showing the desired media content but hiding the long text paragraph. The post about the wedding may be from over the weekend. The social networking website may detect that this specific user has a greater interest in posts that occur within a threshold period of one week. Since this post is less than one week old, the presentation format for the post may include changing the font of the message to catch the attention of the user. Other methods of structuring the identified category to determine the presentation format may also be possible.

At block 460, a presentation format for the message from the source may be determined by comparing a set of user profile criteria with the identified category for the message from the source. At block 480, the message from the source may be presented in the social networking environment using the presentation format. Method 400 concludes at block 499. As described herein, aspects of method 400 relate to using identified categories to dynamically manage the presentation of a message. Aspects of method 400 may provide performance or efficiency benefits for the presentation of a message in a social networking environment. Aspects may save resources such as bandwidth, disk, processing, or memory. As an example, the structuring of the identified category to include user-specified preferences may save battery life of a computing device such as a cell phone, tablet, or laptop computer. A user may set visibility criteria to hide posts they are not interested in viewing. The user may no longer have to waste battery of a device scrolling or searching through their social networking environment to find significant or relevant messages. Other methods of saving battery life of a device may also be possible.

Figure 5:
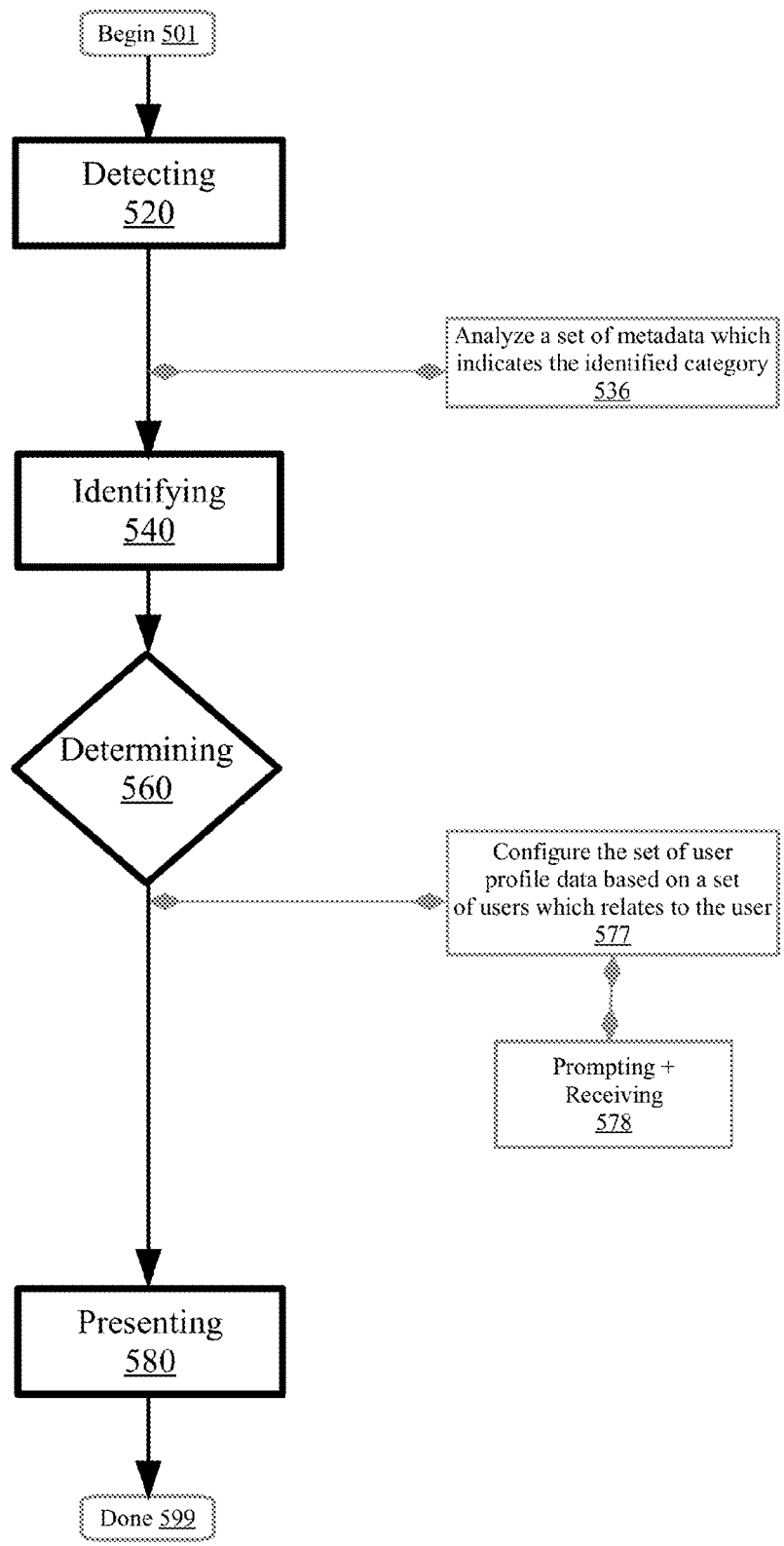
FIG. 5 is a flowchart illustrating a method for message presentation management in a social networking environment, according to embodiments.

FIG. 5 is a flowchart illustrating a method 500 for message presentation management in a social networking environment. Aspects method 500 may be similar or the same as aspects of method 300/400, and aspects may be utilized interchangeably with one or more methodologies described herein. The method 500 may begin at block 501. At block 520, a message from a source may be detected in the social networking environment.

In embodiments, a set of metadata of the message from the source may be analyzed at block 536. Generally, analyzing can include extracting, examining, evaluating, or otherwise assessing a set of metadata of the message. The set of metadata may include information derived from a message which can, in certain instances, indicate the identified category of a message. The set of metadata may include an event tag (e.g., Christmas Eve, birthday party), a location tag (e.g., New York City, Yankee Stadium), a tagged user (e.g., a friend, a family member, a business), a time stamp (e.g., Wednesday, 10:05:15), a hashtag (e.g., a trending topic), or other information (e.g., file size, origination device, computer network address, author/creating-user, modifying user, time-to-live) which indicates the content of a message. The set of metadata of the message from the source may be analyzed to identify the identified category for the message from the source based on the set of candidate categories. The set of metadata of the message from the source may indicate the identified category. As an example, a message in the social networking environment may include a time stamp of March 2010. The predetermined settings of the social networking environment may include removing all posts that exceed a threshold of age of three years. The message with the March 2010 time stamp may be deleted from the social networking environment of the user.

Consider the following example. A user may view several uploaded photographs on a social networking website. The photographs may be from a Fourth of July party at the beach in San Diego, Calif. The photographs may include an event tag (e.g., Fourth of July party), a location tag (e.g., San Diego), a hashtag (e.g., #USA), and a time stamp (e.g., Jul. 4, 2015). The event tag, location tag, hashtag, and time stamp may create a set of metadata for the online photo album. The set of metadata for this post may indicate identified categories for the post. The event tag may indicate a holiday party, but not a life event characteristic. The social networking website may detect that users in general are less interested in holiday party events than major life events (e.g., weddings). Since the event tag indicates a holiday party and not a life event, the determined presentation format may include reducing the size of the photo album in the viewstream of the user. The location tag may be within a threshold radius of twenty miles of the specific user (e.g., fifteen miles). The social networking website may have predetermined settings to change the font of any post tagged within a twenty mile radius of the user. Since the location tag indicates a location within the threshold twenty-mile radius, the font of the post may be changed to catch the attention of the user. The hashtag may correlate with a trending topic. On the day that the user logs on to the social networking website, #USA may be trending with users in California. The social networking website may detect that users in general are currently interested in posts tagged with #USA. The presentation format may include displaying the photo album post near the top of the viewstream of the user. The time stamp may indicate that the post exceeds a threshold relevancy age of one year (e.g., the post is from one year and three months ago). The social networking website may detect that this specific user rarely interacts with posts exceeding a threshold age of one year. The presentation format may include hiding the photo album from the viewstream of the user. Other examples of analyzing a set of metadata of the message may also be possible.

At block 540, an identified category for the message from the source may be identified based on a set of candidate categories. At block 560, a presentation format for the message from the source may be determined by comparing a set of user profile criteria with the identified category for the message from the source.

In embodiments, the set of user profile criteria may be configured based on a set of users which relates to the user at block 577. Generally, configuring can include arranging, organizing, constructing, or otherwise composing the set of user profile criteria based on a set of similar users. The set of user profile criteria may be configured based on the specific user, other similar users, users of the application or website in general, or some combination of these. The set of user profile criteria may be configured based on other preferences of a specific user that have been input into the user profile criteria or have been machine-learned by the system. The set of user profile criteria may be configured based on similar users. Users may be determined "similar" based on overlapping attributes such as demographic information (e.g., same age, similar ages), location (e.g., same/similar/related neighborhood, town, state, country, within a threshold radius), pages or messages liked (e.g., like similar pages, like the same pages), comparison of a friends or followers list (e.g., many mutual friends, a threshold level of mutual friends, following the same public figures), or the like. The set of user profile criteria may be configured based on some combination of the specific user and a group of similar users. The configuring of the set of user profile criteria may occur with respect to the anticipated presentation of the message to a user. The configuring of the set of user profile criteria may occur in advance of the actual presentation of the message. The set of user profile criteria may include specific user preferences or interests based on predetermined settings, machine-learned patterns, or crowd-sourced information. The set of user profile criteria may include preferred settings for various candidate and/or identified categories. As an example, the set of user profile criteria for a specific user may include a preference for media content, based on the detection of a pattern of the specific user frequently viewing posts with links to news articles.

Consider the following example. A set of profile criteria for a user of a specific social networking application may be configured. The set of profile criteria may include machine-learned preferences of the specific user. As an example, the user may indicate a preference for messages posted within a threshold period of six weeks. The social networking application may detect a pattern of the specific user only viewing, interacting with, or responding to messages from the last six weeks. The set of profile criteria for the specific user may be configured with a threshold temporal period of six weeks. Messages may be detected in the social networking application with respect to a temporal relevance characteristic. Messages older than six weeks may be hidden from the viewstream of the user. The set of profile criteria may include crowd-sourced preferences of users which are similar to the specific user. As an example, a user may watch and comment on a video of their favorite football team via the social media application. Another user may also watch and comment on this video. Due to their shared interest in the same football team, the second user may be determined to be similar to the original user. The set of user profile criteria for the second user may be analyzed. The set of user profile criteria for the original user may be configured to include preferences and settings of the second user. The second user may like a basketball team located in the same city at the football team and may view a lot of messages from that basketball team which contain media content. The set of user profile criteria of the original user may be updated to include a possible interest in the basketball team based on a comparison of location and a mutual interest in messages relating to sports containing media content. The social networking application of the user may recommend messages related to the basketball team. The set of profile criteria may include crowd-sourced preferences of users in general of a specific social networking application. As an example, a trending topic with respect to a major news event (e.g., election) on the social networking application may indicate a general interest in this topic among users. The set of user profile criteria may be configured to include a possible interest in posts pertaining to the election. The social networking application of the user may recommend messages related to the election. Other examples of configuring a set of user profile criteria based on a set of similar users may also be possible.

In embodiments, prompting and receiving may occur at block 578. The user may be prompted with a set of options for the set of user profile criteria. Generally, prompting may include surveying, examining, eliciting, suggesting, or otherwise inquiring about a set of options for the set of user profile criteria. Prompting the user with a set of options for the set of user profile criteria may allow the message presentation management to present messages which are more tailored to the specific user. The set of options may include preferences for various categories, such as life events, action factors, media, natural language, and temporal relevance. The user may be able to choose the settings for their profile criteria and provide these selections back to the message presentation management engine. The selecting may occur through a menu of options (e.g., an option to show life event messages, an option to hide media content messages), a multiple-choice survey (e.g., options to indicate specific natural language characteristics), the changing of a number on a scale (e.g., select an option to show all temporally relevant messages, select an option to show no temporally relevant messages, select an option to show 50% of the temporally relevant messages), or other methods of selection. The set of options may include changing the predetermined settings of the social networking environment or providing user-input settings for the social networking environment. A set of selections for the set of options for the set of user profile criteria may be received from the user. Generally, receiving may include obtaining, acquiring, collecting, or otherwise gathering a set of selections for the set of options for the set of user profile criteria. The user-selected settings for the set of profile criteria may assist in the determining of a presentation format for the message in the social networking environment. The message presentation management engine may use the user-selected options to tailor the social networking environment to the particular interests and preferences of the user.

Consider the following example. A user of a social networking environment may be prompted with a set of options for the set of user profile criteria. The user may be asked to take a survey regarding the presentation format of messages in the social networking environment. The user may be surveyed with respect to various categories of messages, such as life events, media, and natural language. The user may select an option to more prominently display messages with life event characteristics. The user may be prompted with a set of options for various specific types of life event characteristics. The user may indicate a strong interest in messages regarding marriages but little interest in messages regarding birthdays. The user may want to be notified any time there is a message about someone they know getting married, but may not want to know every time someone they know celebrates a birthday. The set of selections with respect to life event characteristics may be received and used to configure the set of user profile criteria. The user may select an option to enlarge the size of messages with media content such as pictures and videos, but to hide messages with audio messages and hyperlinks. The user may select an option to delete all messages containing slang words and spelling errors, but to include any messages using Spanish language. The set of selections made by the user may be added to the set of user profile criteria. The updated user profile criteria may better tailor the viewstream of the social networking application to the specific preferences and interests of the user. Other examples of prompting the user with a set of options and receiving a set of selections for the set of user profile criteria may also be possible.

At block 580, the message from the source may be presented in the social networking environment using the presentation format. Method 500 concludes at block 599. As described herein, aspects of method 500 relate to using identified categories to dynamically manage the presentation of a message. Aspects of method 500 may provide performance or efficiency benefits for the presentation of a message in a social networking environment. Aspects may save resources such as bandwidth, disk, processing, or memory. As an example, bandwidth may be saved through the configuring of a set of user profile criteria. The set of user profile criteria may include the specific preferences of a user in order to tailor the viewstream to the interests of the user. The user may not have to waste bandwidth scrolling or searching through their social networking environment to find relevant or interesting posts. Other methods of saving bandwidth using a set of user profile criteria may also be possible.

Figure 6:
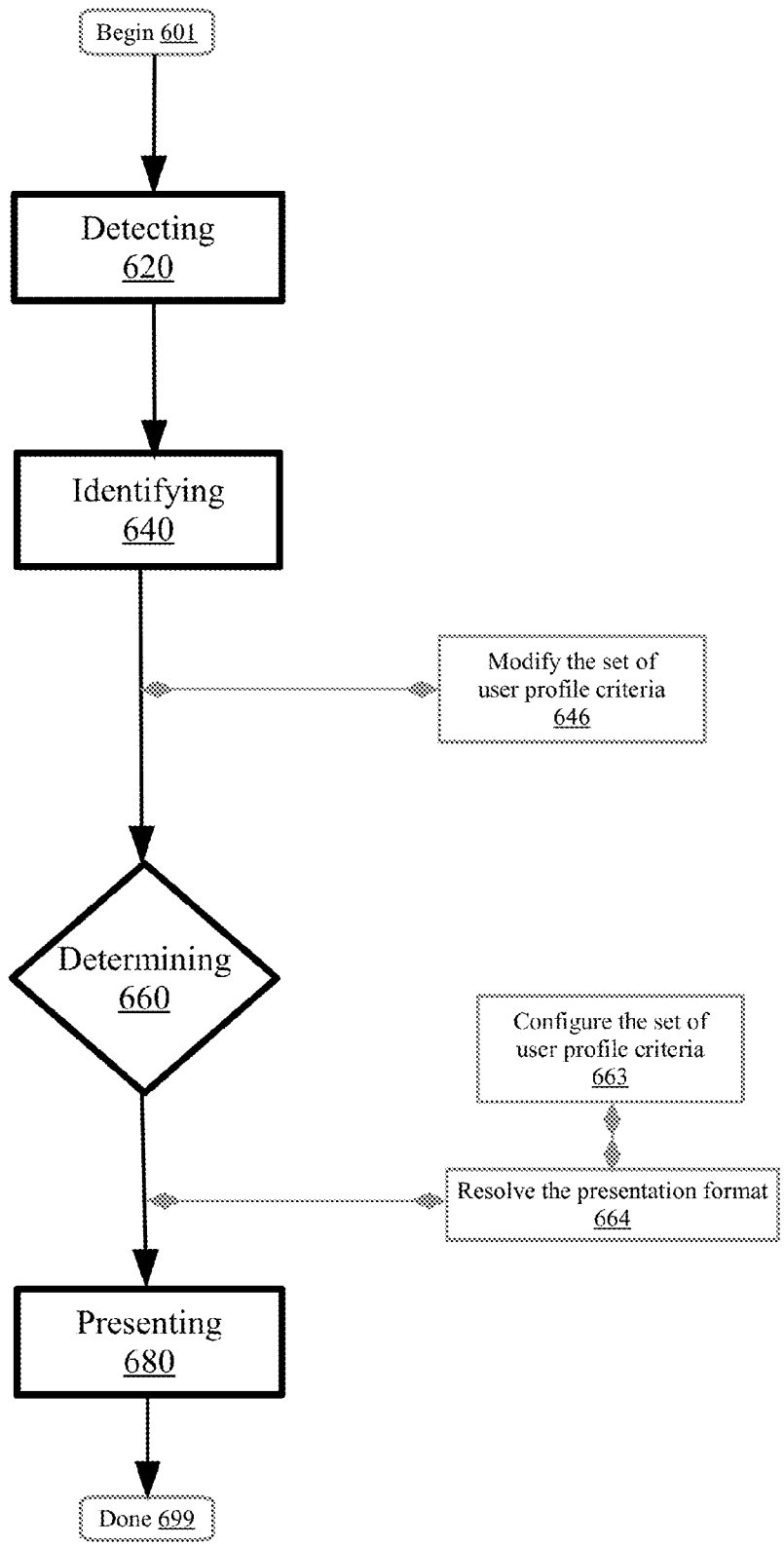
FIG. 6 is a flowchart illustrating a method for message presentation management in a social networking environment, according to embodiments.

FIG. 6 is a flowchart illustrating a method 600 for message presentation management in a social networking environment. Aspects method 600 may be similar or the same as aspects of method 300/400/500, and aspects may be utilized interchangeably with one or more methodologies described herein. The method 600 may begin at block 601. At block 620, a message from a source may be detected in the social networking environment. At block 640, an identified category for the message from the source may be identified based on a set of candidate categories.

In embodiments, the set of user profile criteria may be modified using a machine-learning technique at block 646. Generally, modifying may include altering, changing, adjusting, or otherwise adapting the set of user profile criteria using a machine-learning technique. The machine-learning technique may be a process through which the message presentation management engine can automatically detect patterns, preferences, or inclinations of a user in a social networking environment without being programmed to do so. The machine-learning technique may modify the set of user profile criteria based on detected interests or preferred settings of the user in order to tailor the viewstream in a social networking environment to fit the preferences of a specific user.

Consider the following example. The set of profile data for a user may be configured such that all messages with a life event characteristic may be displayed in the social networking environment. The user may have indicated in the past a preference for posts with life event content through frequent interactions such as views, comments, likes, or shares. The user may have recently gotten divorced while many other users in the same social networking environment are getting married. The recently divorced user may get upset seeing so many messages with content related to weddings and begin to ignore these posts instead of commenting on or sharing them. The set of profile criteria for this user may be modified using a machine-learning technique. A pattern may be detected wherein the user is uninterested in posts with the specific life event characteristic (e.g., weddings). The set of profile data for this user may be modified to include a new presentation format for messages with content related to weddings. The updated presentation format may include hiding these messages from the viewstream or reducing the size of these messages in the social networking environment. Other methods of modifying the set of user profile criteria using a machine-learning technique may also be possible.

At block 660, a presentation format for the message from the source may be determined by comparing a set of user profile criteria with the identified category for the message from the source. In embodiments, the set of user profile criteria may be configured based on a common connection of the user and the source at block 663. Configuring may include structuring, arranging, constructing, or otherwise organizing the set of user profile criteria based on a common connection of the user and the source. The set of user profile criteria may be based on the user profile criteria and settings of a specific similar user. The common connection may be a mutual associate of both the user and the source or another user of a social networking environment. The common connection may be analyzed to tailor the viewstream of a user to their specific preferences. As an example, a user may follow a celebrity on a social networking website. The celebrity may send messages containing information about life events. The user may not be as interested in the life events of the celebrity as they are interested in the life events of their close friends and family. The user profile criteria may be configured to reduce the number of life event messages from the celebrity and promote life event messages from close friends and family.

Consider the following example. Alice may be a user of a specific social networking environment. Alice may frequently send messages to Bob in the social networking environment. Bob may also frequently send messages to and receive messages from Charlie. Charlie may have a set of user profile criteria which indicates a presentation format for messages from Bob. As an example, Bob may be a terrible speller, and Charlie may not enjoy reading messages from Bob with spelling errors. The set of user profile criteria for Charlie may include deleting, removing, or hiding messages from Bob which exceed a threshold of two spelling errors. Since Charlie and Alice both receive messages from Bob, a set of user profile criteria for Alice may be configured based on the common connection between her and Charlie (e.g., friendship with Bob). The set of user profile criteria for Alice may be configured in a similar way to the set of user profile criteria for Charlie. The set of user profile criteria for Alice may include also deleting messages from Bob which exceed a threshold of two spelling errors. Other examples of configuring a set of user profile criteria based on a common connection of the user and the source are also possible.

In embodiments, the presentation format may be resolved using both the identified category and the source at block 664. Generally, resolving can include determining, concluding, computing, selecting, formulating, or otherwise ascertaining the presentation format. The presentation format may include a set of display attributes, qualities, characteristics, or features of a message as described herein. The presentation format may be resolved based on a combination of the identified category and information collected from the source of the message. The information collected from the source of the message may include the set of user profile criteria, machine-learned user preferences, or other types of information. The identified category as well as the set of user profile criteria for the source of message may be analyzed and compared in order to resolve the presentation format of a message.

Consider the following example. A user of social networking website may read a news article shared in their viewstream. The user may strongly disagree with the opinion of the friend who shared the news article. The user may comment on the article using negative language and emoticons. A third user may comment on the article in a similar way, or even like or reply to the comment of the original user. The third user may eventually decide to alter their profile settings to hide all opinion-related posts from the friend who originally shared the article. The similar action factor and natural language characteristics of the third user and the original user may trigger the comparison of the set of profile data of the two users. The set of profile data of the original user may be configured in a similar way as the set of profile data of the third user such that all opinion-related posts from the friend will be hidden from the viewstream. The presentation format (e.g., hiding the news article/opinionated text) may be resolved for the original user. Other methods of resolving the set of user profile criteria using both the identified category and the source may also be possible.

At block 680, the message from the source may be presented in the social networking environment using the presentation format. Method 600 concludes at block 699. As described herein, aspects of method 600 relate to using identified categories to dynamically manage the presentation of a message. Aspects of method 600 may provide performance or efficiency benefits for the presentation of a message in a social networking environment. Aspects may save resources such as bandwidth, disk, processing, or memory. As an example, using similar users to create a set of profile criteria for a user may save processing time. Basing a set of user profile criteria off of preexisting profile criteria for another user may take less processing time than creating an entirely new set of profile criteria. Also, the set of profile criteria for a user may be created dynamically while the user is logged onto the social networking environment. By dynamically creating a set of user profile criteria in real-time, processing time may be saved. Other methods of saving processing time may also be possible.

Consider the following example. Jack, the user of a social networking environment, may receive a message from his friend Liz. The message may be detected in the social networking environment and an identified category for the message may be identified based on a set of candidate categories. The social networking website used by Jack may have a predetermined setting to hide any message which does not include any action factor characteristics. Specifically, the social networking website used by Jack may be configured such that messages with zero likes do not appear in the viewstream of the user. A presentation format for the message from Liz may be determined (e.g., hide the message from Liz because it has zero likes). Another friend of Liz may view the message and like it. The presentation format for the message may change now that the message has achieved a threshold level of one like. The message from Liz may now appear in the viewstream. Jack may receive another message from Carl. Carl may share a link to an article about his favorite football team. The social networking website used by Jack may include a machine-learned clustered setting which indicates that Jack is generally interested in messages with media content. A presentation format for the message from Carl may be determined (e.g., add the message from Carl to Jack's viewstream). The social networking website used by Jack may also include a machine-learned clustered setting which indicates that Jack is uninterested in messages older than six months. The message from Carl may be from last year. Since one year is a longer amount of time than six months, the message from Carl may be categorized as temporally irrelevant to Jack. A new presentation format for the message from Carl may be determined (e.g., reduce the size of the message from Carl in Jack's viewstream). Jack may receive a third message from Amanda. Amanda may have just been accepted to college in Colorado. Amanda may tag her message with a location of "Colorado." Colorado may exceed a threshold distance of thirty miles from Jack, so the natural language content in Amanda's message may determine a presentation format for the message in Jack's viewstream. The presentation format may include hiding the message from Amanda in Jack's viewstream. The message from Amanda may also include an important life event (e.g., acceptance to college) and the social networking environment of Jack may have a predetermined setting which indicates to change the font of all life event content messages to catch the attention of the user. Since Amanda's post contains important life event information, the presentation format may include changing the font of the message from Amanda.

A set of profile data may be configured for Jack. The set of profile data may be based on a set of users who are similar to Jack. As an example, Jack and Carl may both follow the quarterback from their favorite football team in their social networking environments. The set of profile data configured for Jack may be based on the set of profile data for Carl. The set of profile data for Carl may include a deletion of any post containing more than a threshold level (e.g., 200) of characters. The set of profile data for Jack may now be configured to include a deletion of any post containing more than a threshold level of 200 characters. Jack may be prompted with a set of options for the set of user profile criteria. Jack may select an option to unhide any post containing more than a threshold level of 200 characters. The set of profile criteria for Jack may be configured to reflect his selection regarding the number of characters. Over time, Jack may end up hiding posts with more than 200 characters. Using a machine-learning technique, the set of user profile criteria for Jack may be modified to hide posts with more than 200 characters. Other methods of message presentation management in a social networking environment may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor 5 of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for message presentation management in a social networking environment, the method comprising:

detecting, in the social networking environment, a message from a source;

identifying, based on a set of candidate categories, an identified category for the message from the source, wherein the identified category comprises a life event characteristic, an action factor characteristic, a media characteristic, a natural language characteristic, and a temporal relevance characteristic;

determining, for a user receiving the message from the source, a set of user profile criteria by:

prompting the user with a set of options for the set of user profile criteria;

receiving, from the user, a set of selections for the set of options for the set of user profile criteria; and modifying the set of user profile criteria using a machine-learning technique;

determining a presentation format for the message by comparing the set of user profile criteria with the life event characteristic, the action factor characteristic, the media characteristic, the natural language characteristic, and the temporal relevance characteristic; and presenting the message to the user, in the social networking environment, according to the determined presentation format.

* * * * *